(12) United States Patent
Patil et al.

(10) Patent No.: US 9,298,724 B1
(45) Date of Patent: Mar. 29, 2016

(54) SYSTEMS AND METHODS FOR PRESERVING DEDUPLICATION EFFORTS AFTER BACKUP-JOB FAILURES

(71) Applicant: Symantec Corporation, Mountain View, CA (US)

(72) Inventors: Deepak Patil, Maharashtra (IN); Vishal Bajpai, Roseville, MN (US)

(73) Assignee: Symantec Corporation, Mountain View, CA (US)

( * ) Notice: Subject to any disclaimer, the term of this patent is extended or adjusted under 35 U.S.C. 154(b) by 260 days.

(21) Appl. No.: 13/917,761

(22) Filed: Jun. 14, 2013

(51) Int. Cl.
*G06F 17/30* (2006.01)
(52) U.S. Cl.
CPC .................. *G06F 17/30156* (2013.01)
(58) Field of Classification Search
CPC ............ G06F 17/30067; G06F 17/30489
USPC ......................................... 707/692
See application file for complete search history.

(56) References Cited

U.S. PATENT DOCUMENTS

| | | | |
|---|---|---|---|
| 7,567,188 B1 | 7/2009 | Anglin et al. | |
| 7,594,085 B1 * | 9/2009 | Rao | 711/159 |
| 8,041,907 B1 | 10/2011 | Wu et al. | |
| 8,108,446 B1 | 1/2012 | Christiaens | |
| 8,108,447 B2 | 1/2012 | Guo | |
| 8,224,874 B2 | 7/2012 | Guo et al. | |
| 8,224,875 B1 | 7/2012 | Christiaens et al. | |
| 8,307,176 B1 | 11/2012 | Wu et al. | |
| 8,392,376 B2 | 3/2013 | Guo | |
| 8,504,529 B1 | 8/2013 | Zheng et al. | |
| 8,712,976 B1 | 4/2014 | Chen et al. | |
| 8,732,403 B1 | 5/2014 | Nayak | |
| 9,021,452 B2 * | 4/2015 | Kripalani | 717/135 |
| 2007/0043734 A1 | 2/2007 | Cannon et al. | |
| 2010/0250549 A1 | 9/2010 | Muller et al. | |
| 2011/0167096 A1 * | 7/2011 | Guo et al. | 707/816 |
| 2012/0036113 A1 | 2/2012 | Lillibridge et al. | |
| 2013/0036289 A1 | 2/2013 | Welnicki et al. | |
| 2013/0080403 A1 | 3/2013 | Yamakawa | |
| 2013/0110784 A1 | 5/2013 | Guo et al. | |

(Continued)

OTHER PUBLICATIONS

Xianbo Zhang, et al.; U.S. Appl. No. 13/646,852, filed Oct. 8, 2012.

(Continued)

*Primary Examiner* — Scott A Waldron
*Assistant Examiner* — Dongming Wang
(74) *Attorney, Agent, or Firm* — ALG Intellectual Property, LLC

(57) ABSTRACT

A computer-implemented method for preserving deduplication efforts after backup-job failures may include (1) identifying a deduplicated data system that reduces redundant data storage by storing and referencing a plurality of deduplicated data segments and reclaims storage space by deleting unreferenced data segments from the deduplicated data system, (2) identifying a backup job that backs up data to the deduplicated data system, causes the deduplicated data system to store at least one new data segment available to be referenced within the deduplicated data system, and fails after the deduplicated data system stores the new data segment within the deduplicated data system causing the new data segment to be unreferenced within the deduplicated data system, and (3) causing the deduplicated data system to retain the new data segment until the backup job is retried despite the new data segment being unreferenced. Various other methods, systems, and computer-readable media are also disclosed.

18 Claims, 8 Drawing Sheets

(56) References Cited

U.S. PATENT DOCUMENTS

2013/0254402 A1* 9/2013 Vibhor et al. ............... 709/226
2014/0025917 A1 1/2014 Kaczmarczyk et al.

OTHER PUBLICATIONS

Xianbo Zhang; U.S. Appl. No. 13/250,156, filed Sep. 30, 2011.
"Data Domain Deduplication Storage Systems", http://www.emc.com/data-protection/data-domain/data-domain-deduplication-storage-systems.htm, as accessed Mar. 20, 2013, EMC Corporation, (on or before Mar. 20, 2013).
"Data Domain Protection Storage for Backup and Archive Data", http://www.emc.com/domains/datadomain/index.htm, as accessed Mar. 20, 2013, EMC Corporation, (Jul. 20, 2012).
"CommVault", http://www.commvault.com/, as accessed Mar. 20, 2013, (Dec. 2, 1998).
Fanglu Guo et al.; Systems and Methods for Increasing Restore Speeds of Backups Stored in Deduplicated Storage Systems; U.S. Appl. No. 13/889,191, filed May 7, 2013.
Neel Bhatt et al.; Systems and Methods for Managing References in Deduplicating Data Systems; U.S. Appl. No. 13/915,072, filed Jun. 11, 2013.

* cited by examiner

SYSTEMS AND METHODS FOR PRESERVING DEDUPLICATION EFFORTS AFTER BACKUP-JOB FAILURES

BACKGROUND

Conventional deduplicated data systems may reduce the amount of storage space needed to back up data by recognizing redundant data patterns. For example, a deduplicated data system may reduce the amount of space needed to back up similar data by dividing data into data segments and storing only unique data segments. In this example, a data object (e.g., a file or a backup image) backed up to a deduplicated data system may be represented by a list of references to the unique data segments within the deduplicated data system that make up the data object.

Some conventional deduplicated data systems may be configured to reclaim unused storage space by periodically deleting unreferenced data segments. Unfortunately, when a conventional backup system attempts to back up data to such a deduplicated data system but fails before the attempt is completed, new unique data segments transmitted to and stored within the deduplicated data system during the attempt may become unreferenced within the deduplicated data system and may, as a result, be deleted before the backup system can again attempt to back up the data to the deduplicated data system. In these instances, when the backup system retries backing up the data to the deduplicated data system, the unique data segments may be retransmitted to and stored within the deduplicated data system. Accordingly, the instant disclosure addresses a need for additional and improved systems and methods for preserving deduplication efforts after backup-job failures.

SUMMARY

As will be described in greater detail below, the instant disclosure generally relates to systems and methods for preserving deduplication efforts after backup-job failures. In one example, a computer-implemented method for preserving deduplication efforts after backup-job failures may include (1) identifying a deduplicated data system that reduces redundant data storage by storing and referencing deduplicated data segments and reclaims storage space by deleting unreferenced data segments from the deduplicated data system, (2) identifying a backup job that backs up data to the deduplicated data system, causes the deduplicated data system to store at least one new data segment available to be referenced within the deduplicated data system, and fails after the deduplicated data system stores the new data segment within the deduplicated data system causing the new data segment to be unreferenced within the deduplicated data system, and (3) causing the deduplicated data system to retain the new data segment until the backup job is retried despite the new data segment being unreferenced so that the new data segment is available to be referenced within the deduplicated data system when the backup job is retried.

In some examples, the step of causing the deduplicated data system to retain the new data segment until the backup job is retried may include (1) determining a minimum retention period for the new data segment and (2) causing the deduplicated data system to retain the new data segment until the minimum retention period of the new data segment expires.

In one example, the length of the minimum retention period of the new data segment may be equal to or greater than the length of a reclamation period of the deduplicated data system (e.g., the time period after which the deduplicated data system reclaims storage space by deleting unreferenced data segments from the deduplicated data system). In other examples, the length of the minimum retention period of the new data segment may be equal to or greater than the length of a retry period of the backup job (e.g., the time period after which the backup job is retried).

In certain examples, the length of the minimum retention period of the new data segment may be equal to or greater than the amount of time that elapsed while the backup job backed up data to the deduplicated data system combined with the length of the retry period of the backup job. In some examples, the minimum retention period of the new data segment may be defined by a user.

In at least one example, the step of causing the deduplicated data system to retain the new data segment until the backup job is retried may include causing the deduplicated data system to retain the new data segment until the backup job is retried successfully.

In one example, the deduplicated data system may (1) store and reference deduplicated data segments by storing the deduplicated data segments within containers and referencing the containers and (2) reclaim storage space by deleting unreferenced containers from the deduplicated data system. In this example, a backup job may cause the deduplicated data system to store at least one new data segment within at least one new container available to be referenced within the deduplicated data system and may fail causing the new container to be unreferenced within the deduplicated data system. In certain examples, the step of causing the deduplicated data system to retain the new data segment until the backup job is retried may include causing the deduplicated data system to retain the new container until the backup job is retried despite the new container being unreferenced so that the new container is available to be referenced within the deduplicated data system when the backup job is retried.

In one embodiment, a system for implementing the above-described method may include (1) an identification module that identifies a deduplicated data system that reduces redundant data storage by storing and referencing deduplicated data segments and reclaims storage space by deleting unreferenced data segments from the deduplicated data system and a backup job that backs up data to the deduplicated data system, causes the deduplicated data system to store at least one new data segment available to be referenced within the deduplicated data system, and fails after the deduplicated data system stores the new data segment within the deduplicated data system causing the new data segment to be unreferenced within the deduplicated data system, (2) a retention module that causes the deduplicated data system to retain the new data segment until the backup job is retried despite the new data segment being unreferenced so that the new data segment is available to be referenced within the deduplicated data system when the backup job is retried, and (3) at least one processor that executes the identification module and the retention module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a deduplicated data system that reduces redundant data storage by storing and referencing deduplicated data segments and reclaims storage space by deleting unreferenced data segments from the deduplicated data system, (2) identify a backup job that backs up data to the deduplicated data system, causes the deduplicated data system to store at least one new data segment available to be referenced within the deduplicated data system, and fails after the deduplicated data system stores the new data segment within the deduplicated data system causing the new data segment to be unreferenced within the deduplicated data system, and (3) cause the deduplicated data system to retain the new data segment until the backup job is retried despite the new data segment being unreferenced so that the new data segment is available to be referenced within the deduplicated data system when the backup job is retried.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
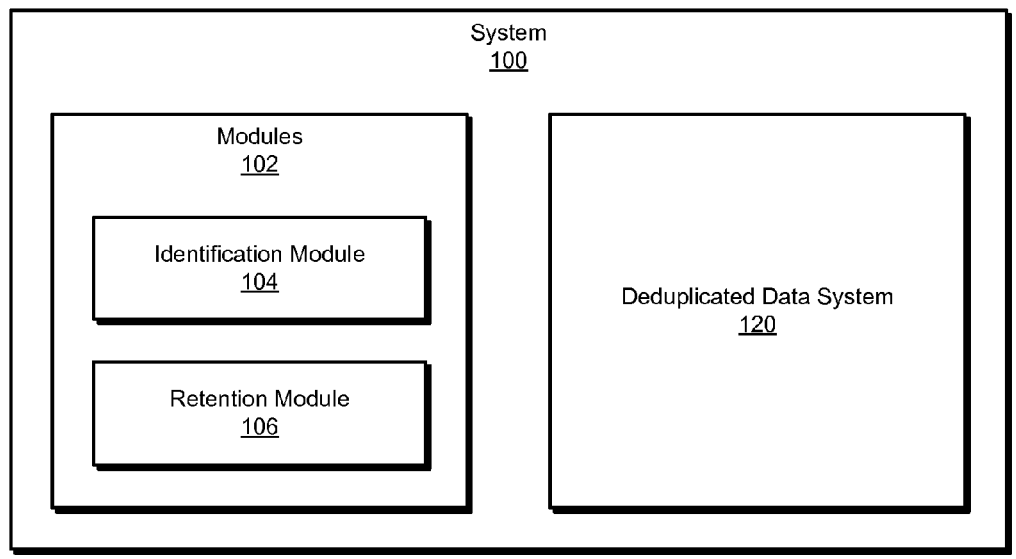
FIG. 1 is a block diagram of an exemplary system for preserving deduplication efforts after backup-job failures.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for preserving deduplication efforts after backup-job failures. As will be explained in greater detail below, by retaining new data segments stored within deduplicated data systems when backup jobs fail until the failed backup jobs can be retried even though the new data segments and/or the containers within which the new data segments are stored may be unreferenced, the systems and methods described herein may preserve deduplication efforts after backup-job failures. Furthermore, in some examples, by ensuring that new data segments stored within deduplicated data systems when backup jobs fail are available to be referenced when backup jobs are retried, these systems and methods may improve the deduplication rates and backup times of retried backup jobs. Embodiments of the instant disclosure may also provide various other advantages and features, as discussed in greater detail below.

Figure 2:
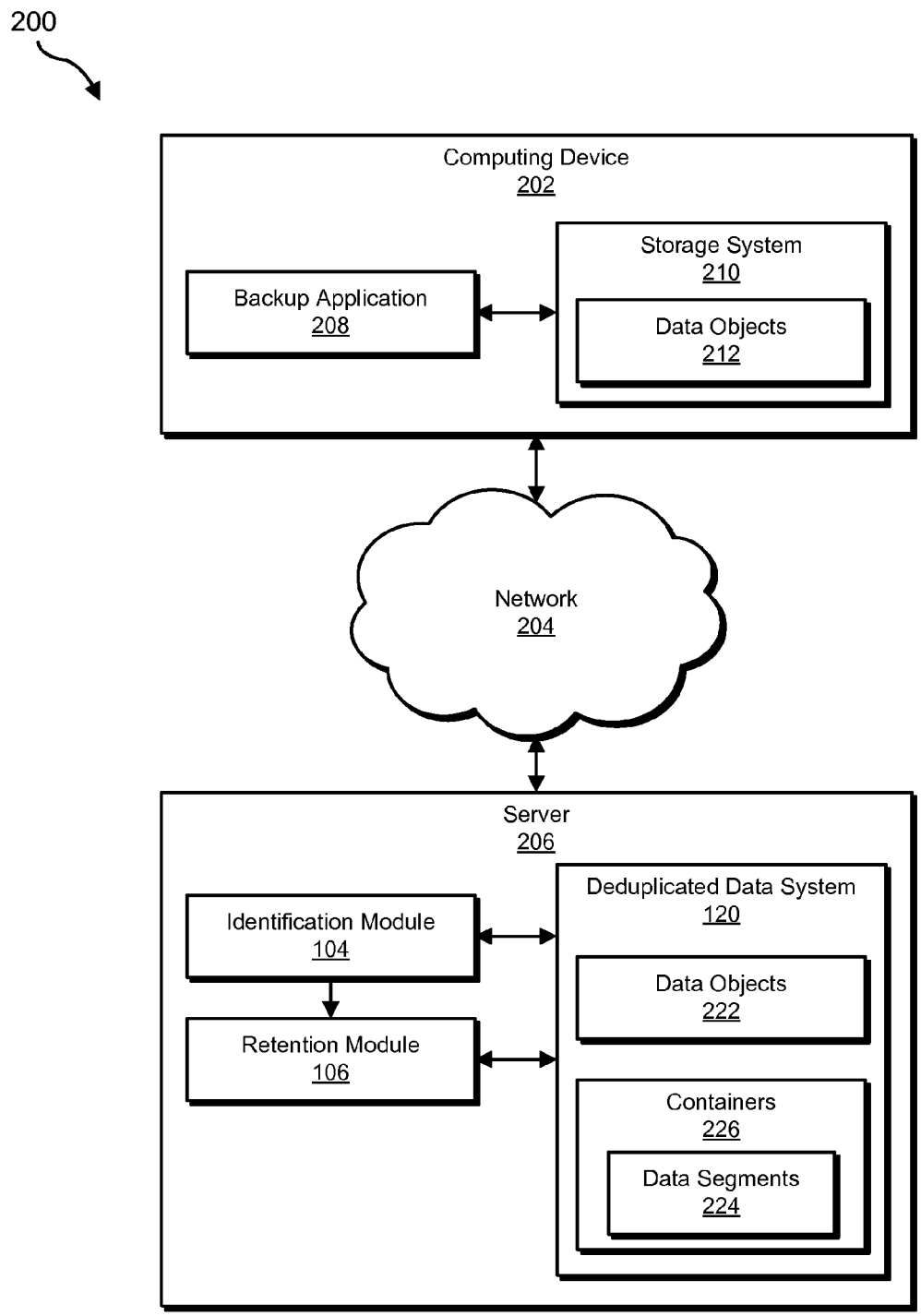
FIG. 2 is a block diagram of an exemplary system for preserving deduplication efforts after backup-job failures.

The following will provide, with reference to FIGS. 1-2, detailed descriptions of exemplary systems for preserving deduplication efforts after backup-job failures. Detailed descriptions of corresponding computer-implemented methods will also be provided in connection with FIG. 3. Detailed descriptions of an exemplary timeline will be provided in connection with FIG. 4, and detailed descriptions of an exemplary deduplicated data system will be provided with FIGS. 5-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for preserving deduplication efforts after backup-job failures. As illustrated in this figure, exemplary system 100 may include one or more modules 102 for performing one or more tasks. For example, and as will be explained in greater detail below, exemplary system 100 may include an identification module 104 that (1) identifies a deduplicated data system that reduces redundant data storage by storing and referencing deduplicated data segments and reclaims storage space by deleting unreferenced data segments from the deduplicated data system and (2) identifies a backup job that backs up data to the deduplicated data system, causes the deduplicated data system to store at least one new data segment available to be referenced within the deduplicated data system, and fails after the deduplicated data system stores the new data segment within the deduplicated data system causing the new data segment to be unreferenced within the deduplicated data system.

Exemplary system 100 may also include a retention module 106 that causes the deduplicated data system to retain the new data segment until the backup job is retried despite the new data segment being unreferenced so that the new data segment is available to be referenced within the deduplicated data system when the backup job is retried. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include a deduplicated data system, such as deduplicated data system 120. Deduplicated data system 120 may represent any type or form of storage device and/or mechanism capable of deduplicating data. In some examples, deduplicated data system 120 may reduce the storage space required to back up data objects by storing and referencing deduplicated data segments that make up the data objects and may reclaim storage space by deleting unreferenced data segments from deduplicated data system 120. Deduplicated data system 120 may represent portions of a single storage system or computing device or a plurality of storage systems or computing devices. For example, deduplicated data system 120 may represent a portion of server 206 in FIG. 2, computing system 710 in FIG. 7, and/or portions of exemplary network architecture 800 in FIG. 8. Alternatively, deduplicated data system 120 in FIG. 1 may represent one or more physically separate devices capable of being accessed by a computing device, such as computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Server 206 may be programmed with one or more of modules 102. Additionally or alternatively, computing device 202 may be programmed with one or more of modules 102.

In one embodiment, one or more of modules 102 from FIG. 1 may, when executed by at least one processor of computing device 202 and/or server 206, facilitate computing device 202 and/or server 206 in preserving deduplication efforts after backup-job failures. For example, and as will be described in greater detail below, one or more of modules 102 may cause computing device 202 and/or server 206 to (1) identify a deduplicated data system (e.g., deduplicated data system 120) that may reduce redundant data storage by storing and referencing deduplicated data segments (e.g., data segments 224) and reclaims storage space by deleting unreferenced data segments from the deduplicated data system, (2) identify a backup job (e.g., a backup operation performed by backup application 208) that backs up data (e.g., data objects 212) to the deduplicated data system, causes the deduplicated data system to store at least one new data segment available to be referenced within the deduplicated data system, and fails after the deduplicated data system stores the new data segment within the deduplicated data system causing the new data segment to be unreferenced within the deduplicated data system, and (3) cause the deduplicated data system to retain the new data segment until the backup job is retried despite the new data segment being unreferenced so that the new data segment is available to be referenced within the deduplicated data system when the backup job is retried.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 710 in FIG. 7, or any other suitable computing device. As illustrated in FIG. 2, computing device 202 may include a backup application 208 configured to perform various backup jobs on computing device 202 and a storage system 210 containing one or more data objects 212. In at least one example, backup application 208 may be configured to perform a backup job that backs up data objects 212 to server 206 and/or deduplicated data system 120.

Server 206 generally represents any type or form of computing device that is capable of reading computer-executable instructions. Examples of server 206 include, without limitation, application servers and database servers configured to provide various database services and/or run certain software applications. As illustrated in FIG. 2, server 206 may include deduplicated data system 120. In some examples, server 206 may be configured to use deduplicated data system 120 to reduce the storage space required to store data objects backed up from various client computing devices (e.g., computing device 202).

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202 and server 206.

Figure 3:
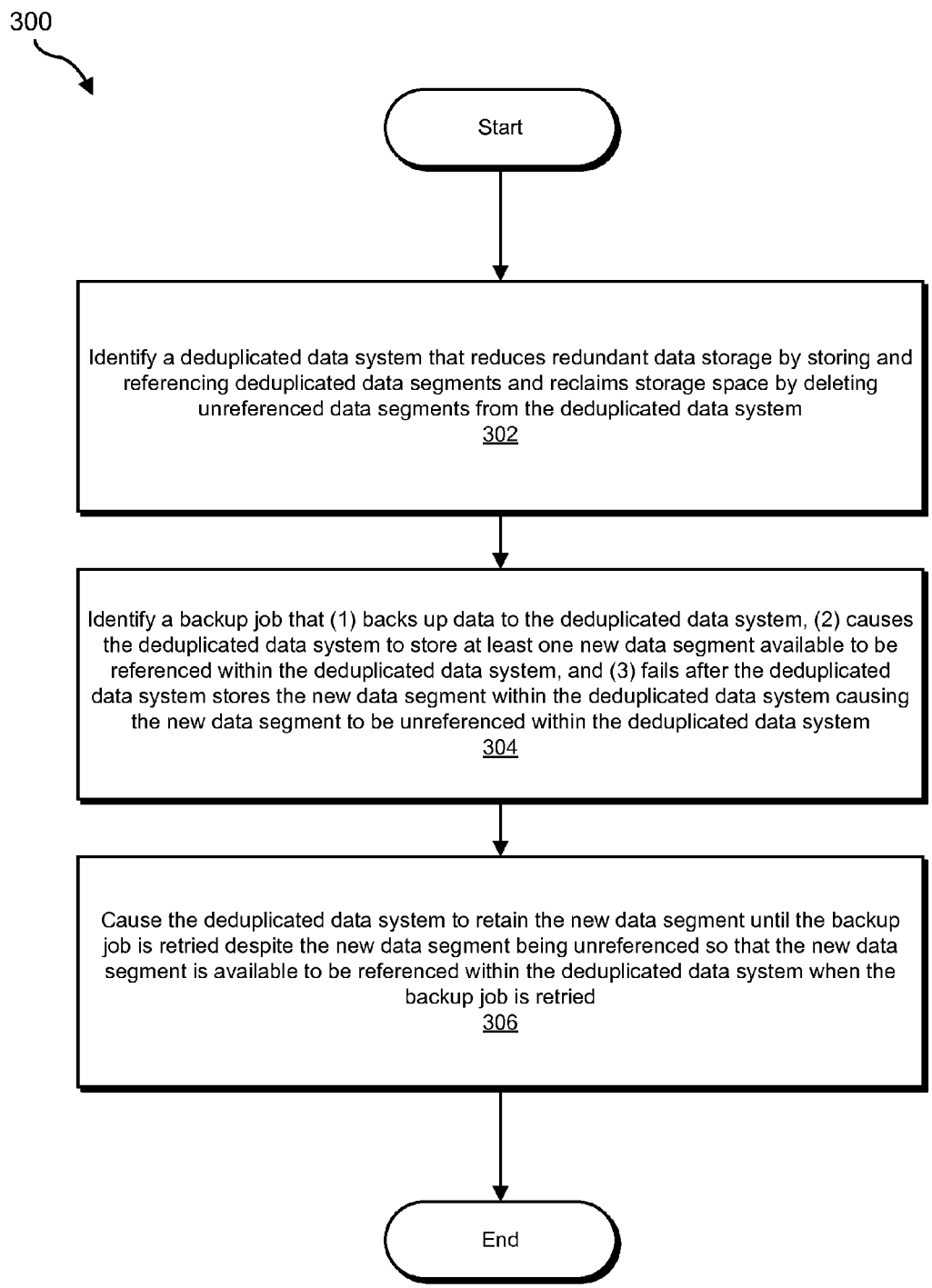
FIG. 3 is a flow diagram of an exemplary method for preserving deduplication efforts after backup-job failures.

FIG. 3 is a flow diagram of an exemplary computer-implemented method 300 for preserving deduplication efforts after backup-job failures. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may identify a deduplicated data system that reduces redundant data storage by storing and referencing deduplicated data segments and reclaims storage space by deleting unreferenced data segments from the deduplicated data system. For example, at step 302 identification module 104 may, as part of server 206 in FIG. 2, identify deduplicated data system 120 that reduces redundant data storage by storing and referencing data segments 224 and reclaims storage space by deleting any data segments within data segments 224 that are or have become unreferenced.

The term "deduplicated data system," as used herein, generally refers to any type or form of storage device and/or mechanism capable of deduplicating data. Examples of deduplicated data systems may include, without limitation, SYMANTEC's NETBACKUP PUREDISK and/or BACKUP EXEC, COMMVAULT's SIMPANA SOFTWARE, and/or EMC's DATA DOMAIN. In at least one example, the term "deduplicated data system" may refer to a single-instance storage system.

In some examples, backup systems may back up data objects (e.g., any collection of data suitable for deduplication, such as a file, a set of files, and/or a backup image) to deduplicated data systems in order to reduce the amount of storage space required to back up the data objects. For example, backup application 208 in FIG. 2 may back up data objects 212 to deduplicated data system 120 in order to reduce the amount of storage space required to back up data objects 212. In general, a deduplicated data system may reduce the amount of storage space required to store similar data objects by dividing the data objects into data segments and storing only unique data segments. As used herein, the term "data segment" may refer to a segment of data, a block of data, or any other suitable unit of data used for data deduplication. By dividing data objects into data segments and storing only unique data segments, a deduplicated data system may be able to store data objects as lists of references to the unique data segments that make up the data objects.

Deduplicated data systems may be configured to reclaim unused storage space by deleting unreferenced data segments. In some examples, the process of reclaiming unused storage space may be referred to as garbage collection. As used herein, the term "unused storage space" may generally refer to storage space that contains data segments that are not referenced by any data object stored within a deduplicated data system.

Generally in order to safely reclaim unused storage space, deduplicated data systems must track which data segments are referenced by data objects and which are not referenced by data objects so that only data segments that are not referenced are deleted. Deduplicated data systems use various methods to track referenced and unreferenced data segments. For example, a deduplicated data system may maintain, for each data segment stored within the deduplicated data system, a list that identifies each data object stored within the deduplicated data system that references the data segment. Deduplicated data systems may use these lists to identify unreferenced data segments that may be deleted to reclaim unused storage space.

Other deduplicated data systems may track referenced and unreferenced data segments using reference counts. For example, a deduplicated data system may maintain for each data segment stored within the deduplicated data system a reference count that indicates how many data objects stored within the deduplicated data system reference the data segment. The deduplicated data system may increment a data segment's reference count every time it is referenced by a new data object and decrement the data segment's reference count every time a data object that referenced the data segment is removed from the deduplicated data system. In this example, a deduplicated data system may delete a data segment to reclaim unused storage space when the data segment's reference count drops to zero.

Some deduplicated data systems may store data segments within containers. For example as illustrated in FIG. 2, deduplicated data system 120 may store data segments 224 within containers 226. As used herein, the term "container" may refer to any data structure, storage system, and/or location that stores, contains, includes, and/or points to a subset of data segments stored within a deduplicated data system. In some examples, containers may contain or tend to contain data segments from interrelated data objects. For example, if a deduplicated data system is used as part of a backup system, the deduplicated data system may store (or attempt to store) the data segments of all data objects associated with a given backup job in the same container or set of containers.

Deduplicated data systems that store data segments within containers may be configured to reclaim unused storage space by deleting unreferenced containers (e.g., a container with a reference count of zero and/or a container that contains only unreferenced data segments) in addition to or as an alternative to directly deleting unreferenced data segments. In general, deduplicated data systems track referenced and unreferenced containers using methods similar to those used to track referenced and unreferenced data segments.

Figure 4:
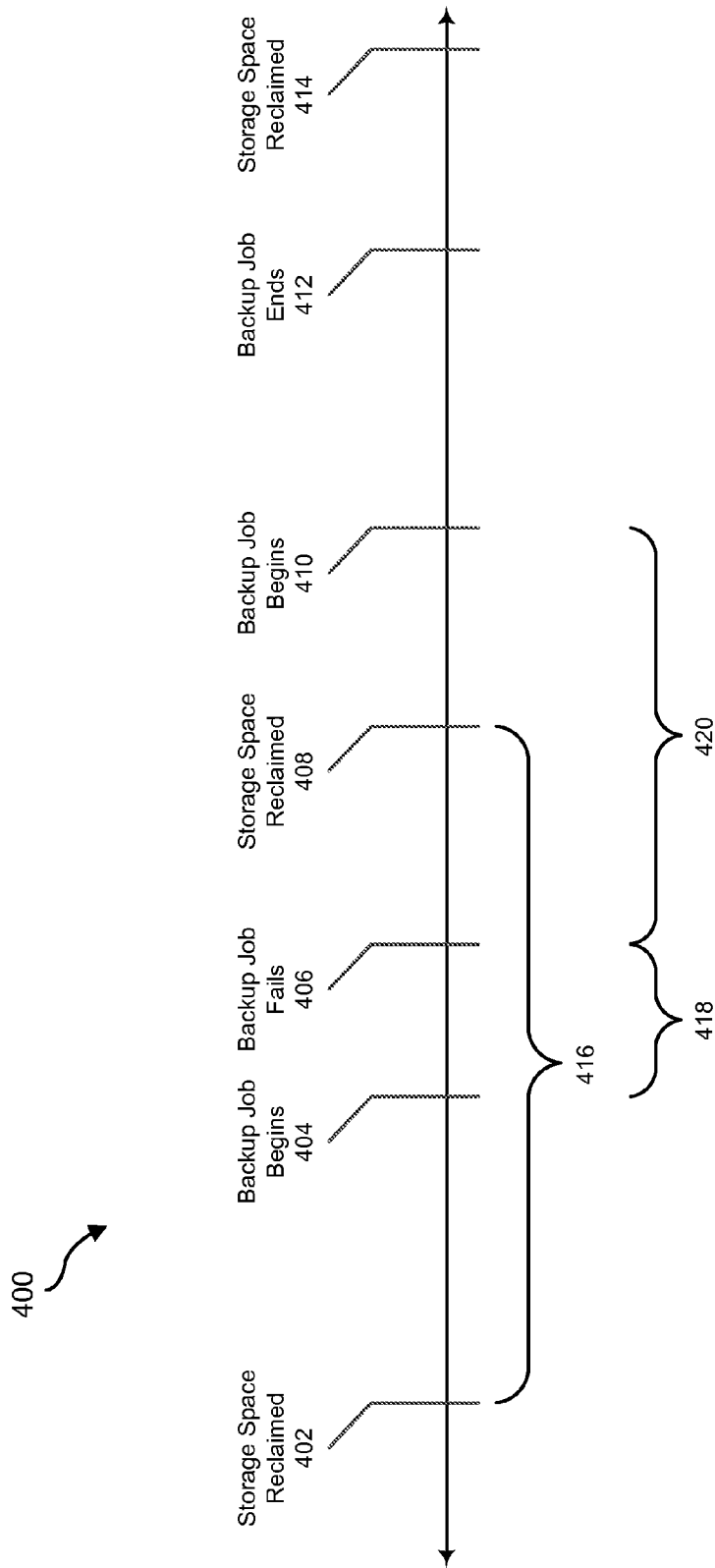
FIG. 4 is a diagram of an exemplary timeline.

Deduplicated data systems may reclaim unused storage space at various times. For example, deduplicated data systems may reclaim unused storage space continuously and/or at regular or irregular intervals. FIG. 4 is an exemplary timeline 400 of various deduplicated data system and backup system related events. In this example, a deduplicated data system reclaims unused storage space at times 402, 408, and 414. In this example, the length of time between times 402 and 408 (and, e.g., the length of time between times 408 and 414) may be equal to the length of reclamation period 416 (e.g., the time period after which the deduplicated data system reclaims storage space by deleting unreferenced data segments from the deduplicated data system).

Returning to FIG. 3, the systems described herein may perform step 302 in any suitable manner. In one example, identification module 104 may identify deduplicated data system 120 by reading a configuration file associated with deduplicated data system 120. Additionally or alternatively, identification module 104 may identify deduplicated data system 120 by identifying (e.g., intercepting, receiving, or retrieving) a request to store data objects to deduplicated data system 120 and/or a request to remove unreferenced data segments and/or containers from deduplicated data system 120. In some contexts, identification module 104 may be an extension and/or a component of deduplicated data system 120, and may implicitly identify deduplicated data system 120 simply through the context in which it is executing.

At step 304, one or more of the systems described herein may identify a backup job that (1) backs up data to the deduplicated data system, (2) causes the deduplicated data system to store at least one new data segment available to be referenced within the deduplicated data system, and (3) fails after the deduplicated data system stores the new data segment within the deduplicated data system causing the new data segment to be unreferenced within the deduplicated data system. For example, at step 304 identification module 104 may, as part of computing device 202 and/or server 206 in FIG. 2, identify a backup job performed by backup application 208 that backs up data objects 212 to deduplicated data system 120, causes deduplicated data system 120 to store at least one new data segment available to be referenced within deduplicated data system 120, and fails after deduplicated data system 120 stores the new data segment within deduplicated data system 120 causing the new data segment and/or the container within which the new data segment is stored to be unreferenced within deduplicated data system 120.

As used herein, the term "backup job" may generally refer to any operation that stores data to a deduplicated data system and whose failure causes new data segments and/or new containers stored to the deduplicated data system as a result of the operation to be unreferenced within the deduplicated data system. In one example, the term "backup job" may refer to a backup operation performed by a backup system that backs up a set of related data objects to a deduplicated data system.

A backup job may cause new data segments and/or new containers to be stored within a deduplicated data system when backing up data objects to the deduplicated data system that contain unique data segments that have not yet been stored within the deduplicated data system. For example, when performing a backup job that backs up data objects to a deduplicated data system, a backup system may divide the data objects into data segments and may transfer to the deduplicated data system unique data segments that have not yet been stored within the deduplicated data system. In this example, the deduplicated data system may store any new data segments that it receives from the backup system. In some instances, the deduplicated data system may store the new data segments within one or more new containers.

Figure 5:
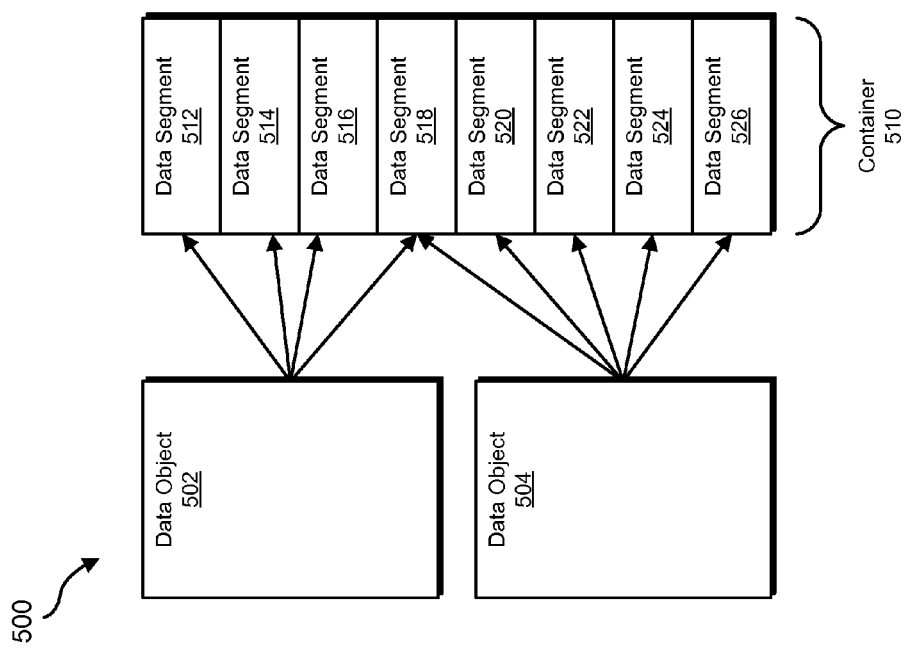
FIG. 5 is a block diagram of an exemplary deduplicated data system.

By way of example, FIG. 5 shows the state of an exemplary deduplicated data system 500 as a backup job is backing up data to deduplicated data system 500. In one example, FIG. 5 may represent the state of exemplary deduplicated data system 500 at a time between time 404 and 406 on exemplary timeline 400 in FIG. 4. As illustrated in FIG. 5, deduplicated data system 500 may include data objects 502 and 504, data segments 512-526, and container 510. Data objects 502 and 504 may represent the data that an unfinished backup job has backed up to deduplicated data system 500, and data segments 512-526 may represent new unique data segments stored to deduplicated data system 500 and available to be referenced within deduplicated data system 500 as a result of data objects 502 and 504 having been backed up to deduplicated data system 500.

As shown in FIG. 5, each of data objects 502 and 504 may include references to the data segments used to store data objects 502 and 504 within deduplicated data system 500. For example, data object 502 may include references to data segments 512-518 used to store data object 502, and data object 504 may include references to data segments 518-526 used to store data object 504. In this example, data segments 512-526 and/or container 510 may be considered referenced.

Figure 6:
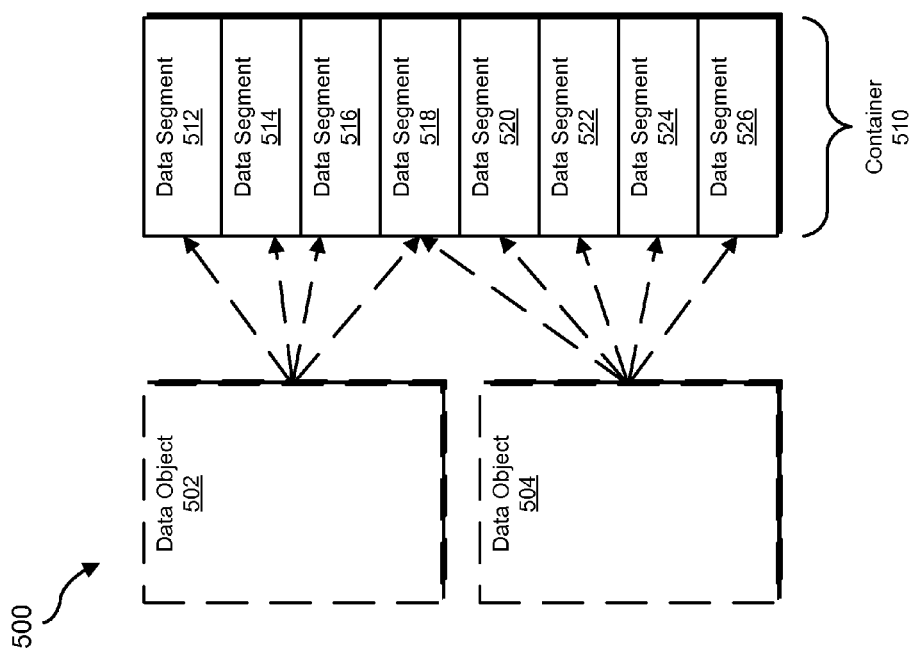
FIG. 6 is a block diagram of an exemplary deduplicated data system.

In some instances, backup jobs may take a considerable amount of time (especially in the case of initial backups) and, as a result, may fail before all data objects have been backed up to a deduplicated data system and/or before all new data segments have been transferred to the deduplicated data system. In some instances, the failure of a backup job may cause new data segments and/or new containers created by the failed backup job to remain or become unreferenced. FIG. 6 shows a state of exemplary deduplicated data system 500 after the backup job that backed up data objects 502 and 504 to deduplicated data system 500 has failed, causing data segments 512-526 and/or container 510 to be unreferenced within deduplicated data system 500. For example, FIG. 6 may illustrate the state of exemplary deduplicated data system 500 at a time between time 406 and 410 on exemplary timeline 400 in FIG. 4. As illustrated in FIG. 5, data objects 502 and 504 may have been deleted when the backup job failed, which may cause data segments 512-526 and/or container 510 to be unreferenced within deduplicated data system 500.

Returning to FIG. 3, the systems described herein may perform step 304 in any suitable manner. In one example, identification module 104 may identify the backup job by reading a configuration file associated with the backup job. Additionally or alternatively, identification module 104 may identify the backup job by identifying (e.g., intercepting, receiving, or retrieving) a request to back up or otherwise store one or more data objects to a deduplicated data system. In some contexts, identification module 104 may be an extension and/or a component of a backup system (e.g., backup application 208) that performs the backup job, and may identify the backup job when the backup application performs the backup job.

Typically, backup systems will retry backup jobs after they fail. Backup systems may retry backup jobs at various times. For example, backup systems may retry failed backup jobs continuously and/or at regular or irregular intervals. As mentioned above, FIG. 4 is an exemplary timeline 400 of various deduplicated data system and backup system related events. In the example shown in FIG. 4, a backup job begins at time 404, is performed for backup period 418, fails at time 406, is retried at time 410, and finishes successfully at time 412. In this example, the length of time between time 406 and 410 may be equal to the length of the retry period 420 of the backup job. As can be seen in FIG. 4, in some instances a deduplicated data system may reclaim unused storage space between the time at which a backup job fails and the backup job is retried.

Returning to FIG. 3, at step 306, one or more of the systems described herein may cause the deduplicated data system to retain the new data segment until the backup job is retried despite the new data segment being unreferenced so that the new data segment is available to be referenced within the deduplicated data system when the backup job is retried. For example, at step 306 retention module 106 may, as part of server 206 in FIG. 2, cause deduplicated data system 120 to retain new unreferenced data segments within data segments 224 and/or new unreferenced containers within containers 226 so that they are available to be referenced when a failed backup job that created them is retried. Upon completion of step 306, exemplary method 300 in FIG. 3 may terminate.

The systems described herein may perform step 306 in any suitable manner. In one example, retention module 106 may cause deduplicated data system 120 to retain unreferenced data segments and/or unreferenced containers by assigning minimum retention periods to new data segments and/or new containers when they are stored within deduplicated data system 120 so that deduplicated data system 120 retains the new data segments and/or the new containers for the length of the minimum retention period even if the new data segments and/or the new containers are unreferenced.

In some examples, before assigning a minimum retention period to a new data segment or a new container, retention module 106 may determine a suitable length for the minimum retention period that will ensure that the new data segment or the new container is available to be referenced when the backup job that created the new data segment or the new container is retried.

In one example, retention module 106 may determine that a suitable length for the minimum retention period of a new data segment and/or a new container should be equal to or greater than the length of the reclamation period of the deduplicated data system within which the new data segment and/or the new container is stored (e.g., reclamation period 416 in FIG. 4). By assigning minimum retention periods with lengths equal to or greater than the length of the reclamation period of the deduplicated data system, retention module 106 may ensure that the new data segment and/or the new container are available to be referenced when the backup job that created them is retried since the minimum retention periods may cause the deduplicated data system to not reclaim the unused storage space containing the new data segment and/or the new container the next time the deduplicated data system reclaims unused storage space.

In another example, retention module 106 may determine that a suitable length for the minimum retention period of a new data segment or a new container should be equal to or greater than the length of a retry period of the backup job that creates the new data segment or the new container (e.g., retry period 420 in FIG. 4). By assigning minimum retention periods with lengths equal to or greater than the length of the retry period of the backup job, retention module 106 may ensure that the new data segment and/or the new container are available to be referenced when the backup job is retried since the minimum retention periods may cause the deduplicated data system to not reclaim the unused storage space containing the new data segment and/or the new container until the backup job is retried.

In at least one example, retention module 106 may determine that a suitable length for the minimum retention period of a new data segment or a new container should be equal to or greater than the amount of time that elapsed while the backup job that created the new data segment or the new container backed up data to a deduplicated data system (e.g., backup time 418 in FIG. 4) combined with the length of the retry period of the backup job. By assigning minimum retention periods with lengths equal to or greater than the amount of time that elapsed while the backup job backed up data to the deduplicated data system combined with the length of the retry period of the backup job, retention module 106 may ensure that the new data segment and/or the new container are available to be referenced when the backup job is retried since the minimum retention periods may cause the deduplicated data system to not reclaim the unused storage space containing the new data segment and/or the new container until the backup job is retried and reaches the same point at which it failed previously.

In some examples, retention module 106 may assign a user-defined minimum retention period to new data segments or new containers. In one example, retention module 106 may identify the user-defined minimum retention period by reading a configuration file associated with the backup job that created the new data segments or the new containers and/or a configuration file associated with the deduplicated data system within which the new data segments or the new containers are stored. Additionally or alternatively, retention module 106 may identify the user-defined minimum retention period by identifying (e.g., intercepting, receiving, or retrieving) a request to store one or more data objects to a deduplicated data system that indicates a minimum retention period for any new data segments and/or any new containers created by storing the one or more data objects to the deduplicated data system.

In some examples, retention module 106 may cause a deduplicated data system to retain new data segments and/or new containers until the backup job that created them is retried successfully. In one example, retention module 106 may ensure that new data segments and/or new containers are retained until the backup job that created them is retried successfully by (1) monitoring the performance of the backup job, (2) associating the new data segments and/or the new containers with the backup job, and (3) retaining the new data segments and/or the new containers until the backup job has been performed and/or retried successfully.

As explained above, by retaining new data segments stored within deduplicated data systems when backup jobs fail until the failed backup jobs can be retried even though the new data segments and/or the containers within which the new data segments are stored may be unreferenced, the systems and methods described herein may preserve deduplication efforts after backup-job failures. Furthermore, in some examples, by ensuring that new data segments stored within deduplicated data systems when backup jobs fail are available to be referenced when backup jobs are retried, these systems and methods may improve the deduplication rates and backup times of retried backup jobs. For example, the systems and methods described herein may preserve deduplication efforts after backup-job failures by assigning a minimum retention period to new data segments and/or new containers stored within deduplicated data systems that causes the deduplicated data systems to retain the new data segments and/or the new containers for the length of the minimum retention period even if the new data segments and/or the new containers are or become unreferenced.

Figure 7:
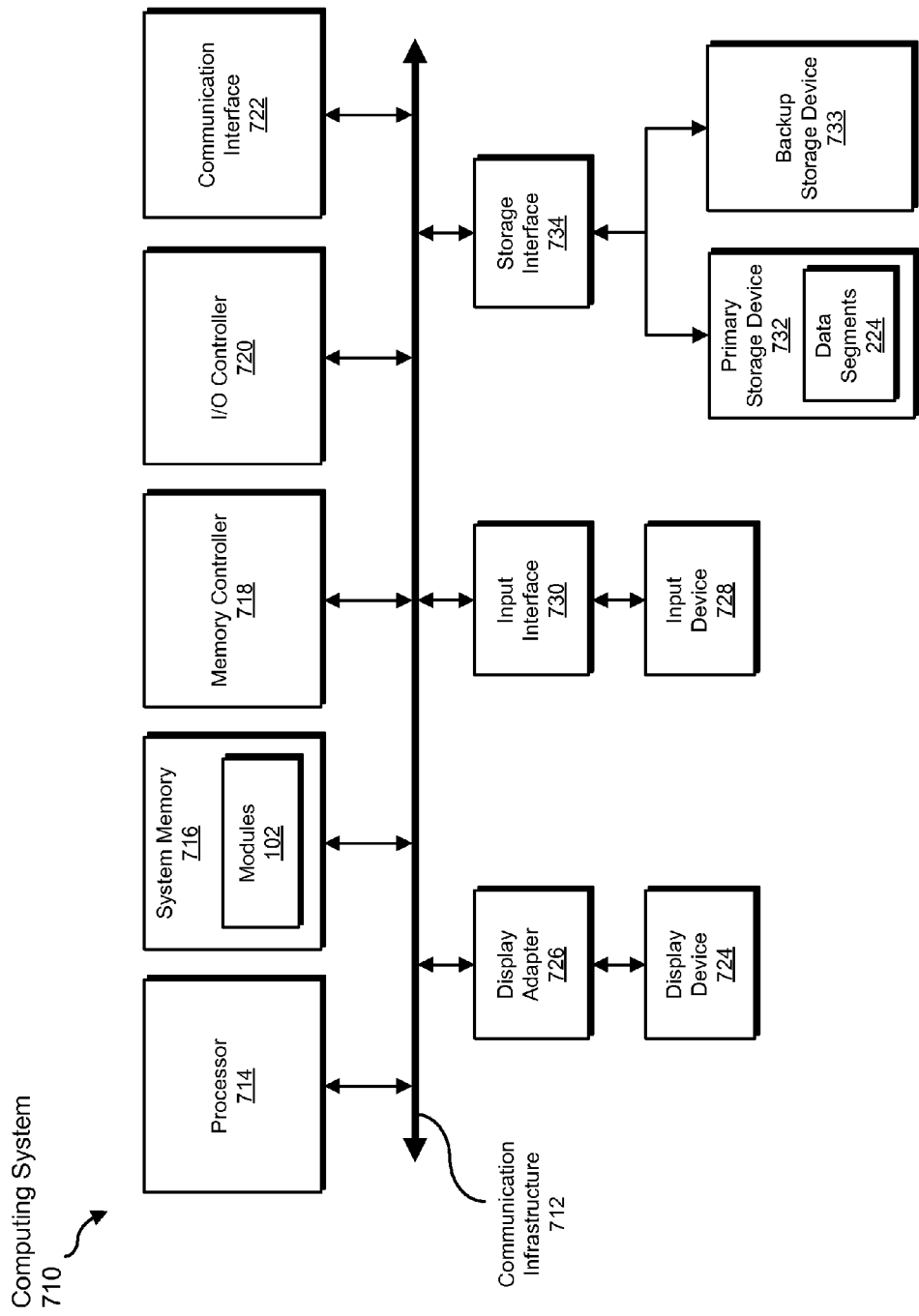
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, data segments 224 from FIG. 2 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
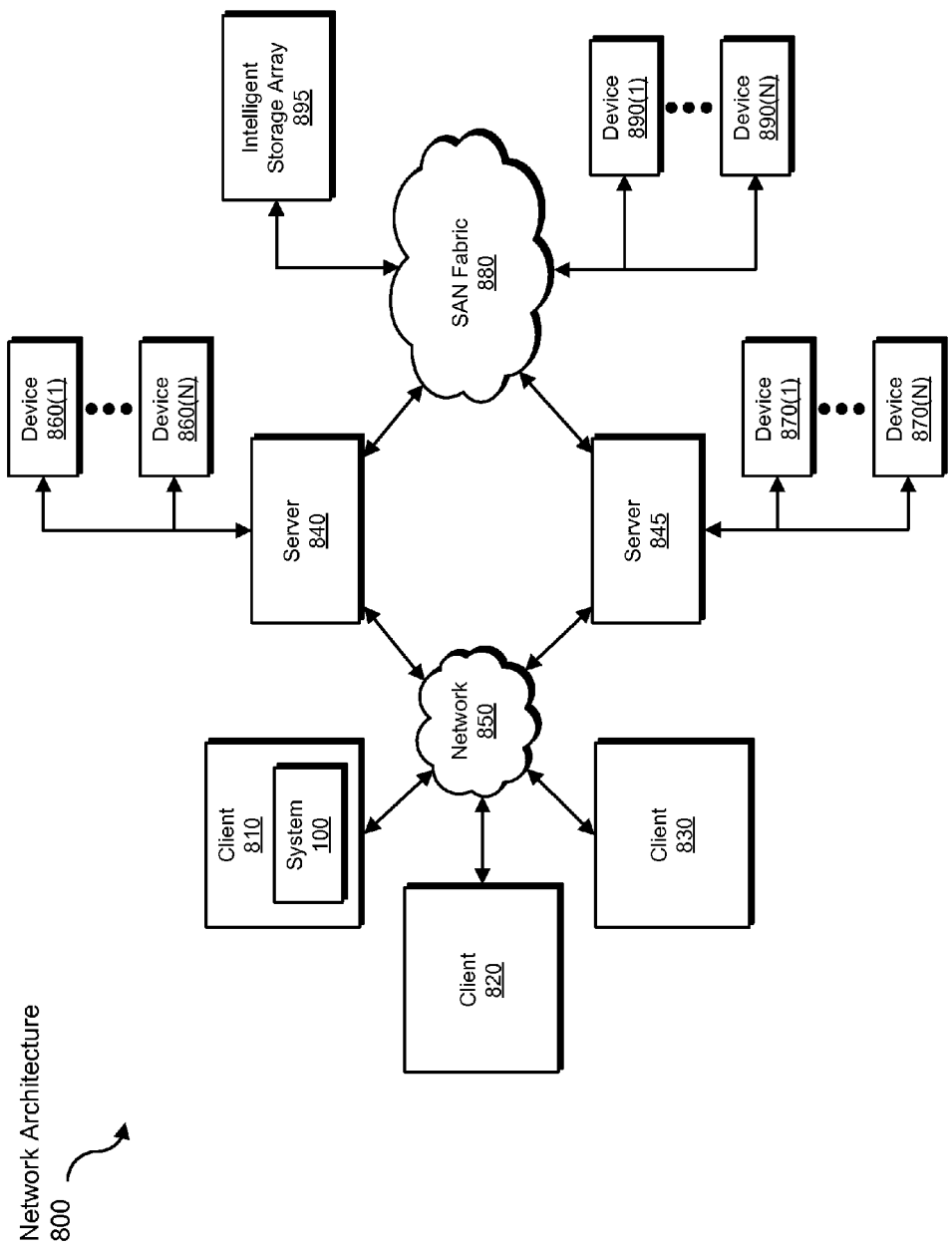
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and intelligent storage array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890 (1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for preserving deduplication efforts after backup-job failures.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data objects to be transformed, transform the data objects into deduplicated data segments that may be retained for a minimum retention period even if the deduplicated data segments and/or the containers within which they are stored are or become unreferenced, output a result of the transformation so that the deduplicated data segments may be available to be referenced within a deduplicated data system when the failed backup job that created the deduplicated data segments is retried, use the result of the transformation to store the data objects when the backup job is retried, and store the result of the transformation to the deduplicated data system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preserving deduplication efforts after backup-job failures at least a portion of the method being performed by a computing device comprising at least one processor, the method comprising:
    identifying a deduplicated data system that reduces redundant data storage by storing and referencing a plurality of deduplicated data segments, wherein the deduplicated data system reclaims storage space by deleting data segments that are not referenced from the deduplicated data system;
    identifying a backup job that backs up data to the deduplicated data system, wherein a first performance of the backup job:
    causes the deduplicated data system to store at least one new data segment that is available to be referenced within the deduplicated data system; and
    fails after the deduplicated data system stores the new data segment within the deduplicated data system, wherein failure of the first performance of the backup job causes the new data segment to not be referenced within the deduplicated data system;
    causing the deduplicated data system to wait at least until a second performance of the backup job occurs by causing the deduplicated data system to retain the new data segment until the second performance of the backup job occurs successfully despite the new data segment being not referenced.

2. The computer-implemented method of claim 1, wherein causing the deduplicated data system to wait at least until the second performance of the backup job can occur comprises:

determining a minimum retention period for the new data segment;

causing the deduplicated data system to retain the new data segment until the minimum retention period of the new data segment expires.

3. The computer-implemented method of claim 2, wherein the length of the minimum retention period of the new data segment is at least equal to the length of a garbage-collection period of the deduplicated data system after which the deduplicated data system reclaims storage space by deleting data segments that are not referenced from the deduplicated data system.

4. The computer-implemented method of claim 2, wherein the length of the minimum retention period of the new data segment is at least equal to the length of a retry period of the backup job after which the second performance of the backup job will occur.

5. The computer-implemented method of claim 4, wherein the length of the minimum retention period of the new data segment is at least equal to the amount of time that elapsed while the first performance of the backup job backed up data to the deduplicated data system combined with the length of the retry period of the backup job after which the second performance of the backup job will occur.

6. The computer-implemented method of claim 2, wherein the minimum retention period of the new data segment is user defined.

7. The computer-implemented method of claim 1, wherein:
the deduplicated data system:
stores and references the plurality of deduplicated data segments by:
storing the plurality of deduplicated data segments within a plurality of containers, wherein each container within the plurality of containers comprises a subset of the plurality of deduplicated data segments;
referencing the plurality of containers;
reclaims storage space by deleting containers that are not referenced from the deduplicated data system;
the first performance of the backup job causes the deduplicated data system to store the new data segment within at least one new container available to be referenced within the deduplicated data system;
failure of the first performance of the backup job causes the new container to not be referenced within the deduplicated data system;
causing the deduplicated data system to wait at least until the second performance of the backup job can occur comprises causing the deduplicated data system to retain the new container until the second performance of the backup job can occur despite the new container being not referenced so that the new container is available to be referenced within the deduplicated data system when the second performance of the backup job occurs.

8. A system for preserving deduplication efforts after backup—
job failures, the system comprising:
an identifying module that identifies:
a deduplicated data system that reduces redundant data storage by storing and referencing a plurality of deduplicated data segments, wherein the deduplicated data system reclaims storage space by deleting data segments that are not referenced from the deduplicated data system;
a backup job that backs up data to the deduplicated data system, wherein a first performance of the backup job:

causes the deduplicated data system to store at least one new data segment that is available to be referenced within the deduplicated data system; and fails after the deduplicated data system stores the new data segment within the deduplicated data system, wherein failure of the first performance of the backup job causes the new data segment to not be referenced within the deduplicated data system;

a retention module that causes the deduplicated data system to wait at least until a second performance of the backup job occurs by causing the deduplicated data system to retain the new data segment until the second performance of the backup job occurs successfully despite the new data segment being not referenced;

at least one processor that executes the identifying module and the retention module.

9. The system of claim 8, wherein the retention module causes the deduplicated data system to wait at least until the second performance of the backup job can occur by:
determining a minimum retention period for the new data segment;
causing the deduplicated data system to retain the new data segment until the minimum retention period of the new data segment expires.

10. The system of claim 9, wherein the length of the minimum retention period of the new data segment is at least equal to the length of a garbage-collection period of the deduplicated data system after which the deduplicated data system reclaims storage space by deleting data segments that are not referenced from the deduplicated data system.

11. The system of claim 9, wherein the length of the minimum retention period of the new data segment is at least equal to the length of a retry period of the backup job after which the second performance of the backup job will occur.

12. The system of claim 11, wherein the length of the minimum retention period of the new data segment is at least equal to the amount of time that elapsed while the first performance of the backup job backed up data to the deduplicated data system combined with the length of the retry period of the backup job after which the second performance of the backup job will occur.

13. The system of claim 9, wherein the minimum retention period of the new data segment is user defined.

14. The system of claim 8, wherein:
the deduplicated data system:
stores and references the plurality of deduplicated data segments by:
storing the plurality of deduplicated data segments within a plurality of containers, wherein each container within the plurality of containers comprises a subset of the plurality of deduplicated data segments;
referencing the plurality of containers;
reclaims storage space by deleting containers that are not referenced from the deduplicated data system;
the first performance of the backup job causes the deduplicated data system to store the new data segment within at least one new container available to be referenced within the deduplicated data system;
failure of the first performance of the backup job causes the new container to not be referenced within the deduplicated data system;
the retention module causes the deduplicated data system wait at least until the second performance of the backup job can occur by causing the deduplicated data system to retain the new container until the second performance of the backup job can occur despite the new container being not referenced so that the new container is available to be referenced within the deduplicated data system when the second performance of the backup job occurs.

15. A non-transitory computer-readable medium comprising one or more computer-executable instructions that, when executed by at least one processor of a computing device, cause the computing device to:
identify a deduplicated data system that reduces redundant data storage by storing and referencing a plurality of deduplicated data segments, wherein the deduplicated data system reclaims storage space by deleting segments that are not referenced from the deduplicated data system;
identify a backup job that backs up data to the deduplicated data system, wherein a first performance of the backup job:
causes the deduplicated data system to store at least one new data segment that is available to be referenced within the deduplicated data system; and
fails after the deduplicated data system stores the new data segment within the deduplicated data system, wherein failure of the first performance of the backup job causes the new data segment to not be referenced within the deduplicated data system;
cause the deduplicated data system to wait at least until a second performance of the backup job occurs by causing the deduplicated data system to retain the new data segment until the second performance of the backup job occurs successfully despite the new data segment being not referenced.

16. The non-transitory computer-readable medium of claim 15, wherein the one or more computer-executable instructions cause the computing device to cause the deduplicated data system to wait at least until the second performance of the backup job can occur by causing the computing device to:
determine a minimum retention period for the new data segment;
cause the deduplicated data system to retain the new data segment until the minimum retention period of the new data segment expires.

17. The non-transitory computer-readable medium of claim 16, wherein the length of the minimum retention period of the new data segment is at least equal to the length of a garbage-collection period of the deduplicated data system after which the deduplicated data system reclaims storage space by deleting data segments that are not referenced from the deduplicated data system.

18. The non-transitory computer-readable medium of claim 16, wherein the length of the minimum retention period of the new data segment is at least equal to the length of a retry period of the backup job after which the second performance of the backup job will occur.

* * * * *